[12] United States Patent
Rahematpura et al.

(10) Patent No.: US 11,112,255 B2
(45) Date of Patent: *Sep. 7, 2021

(54) NETWORK COMPUTER SYSTEM TO ARRANGE POOLED TRANSPORT SERVICES

(71) Applicant: Uber Technologies, Inc., San Francisco, CA (US)

(72) Inventors: Miraj Rahematpura, San Francisco, CA (US); John Mark Nickels, San Francisco, CA (US); Eoin O'Mahony, San Francisco, CA (US); Danhua Guo, San Francisco, CA (US); Vishnu Sundaresan, San Francisco, CA (US); Lior Seeman, San Francisco, CA (US); Meisam Vosoughpour, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,283

(22) Filed: May 27, 2020

(65) Prior Publication Data

US 2020/0292335 A1 Sep. 17, 2020

Related U.S. Application Data

(63) Continuation of application No. 16/179,841, filed on Nov. 2, 2018, now Pat. No. 10,731,998.
(Continued)

(51) Int. Cl.
G01C 21/28 (2006.01)
G01C 21/34 (2006.01)
(Continued)

(52) U.S. Cl.
CPC ......... *G01C 21/3407* (2013.01); *G01C 21/28* (2013.01); *G06Q 10/06* (2013.01); *G08G 1/202* (2013.01); *G08G 1/205* (2013.01)

(58) Field of Classification Search
CPC .... G01C 21/3407; G01C 21/28; G06Q 10/06; G08G 1/202; G08G 1/205
See application file for complete search history.

(56) References Cited

U.S. PATENT DOCUMENTS 5,557,522 A 9/1996 Nakayama
5,948,040 A 9/1999 DeLorme
(Continued)

FOREIGN PATENT DOCUMENTS

CN 104575072 4/2015
CN 104931063 9/2015
(Continued)

OTHER PUBLICATIONS

International Search Report in PCT/US2015/043654 dated Nov. 26, 2015.
(Continued)

*Primary Examiner* — Mohamed A Kamara
(74) *Attorney, Agent, or Firm* — Mahamedi IP Law LLP

(57) ABSTRACT

A network computer system operates to receive service requests from multiple requesters. Based at least in part on a proximity between the current locations of a first and a second requester, the system can match the first service request and the second service request by (i) selecting a pickup location for the first and second requesters, (ii) transmitting rendezvous information to the computing devices of the first and second requesters, (iii) determining an estimated time interval for each of the first requester and the second requester to arrive at the pickup location, and (iv) selecting a transport provider to service both the first trans-
(Continued)

port request and the second transport request, based at least in part on the pickup location, a current location of the transport provider, and the estimated time interval for each of the first requester and the second requester.

20 Claims, 6 Drawing Sheets

Related U.S. Application Data

(60) Provisional application No. 62/581,765, filed on Nov. 5, 2017.

(51) Int. Cl.
*G08G 1/00* (2006.01)
*G06Q 10/06* (2012.01)

(56) References Cited

U.S. PATENT DOCUMENTS

| | | | |
|---|---|---|---|
| 6,058,339 | A | 5/2000 | Takiguchi |
| 6,233,517 | B1 | 5/2001 | Froeberg |
| 6,321,158 | B1 | 11/2001 | DeLorme |
| 7,263,437 | B2 | 8/2007 | Hirose |
| 7,822,426 | B1 | 10/2010 | Wuersch |
| 8,005,488 | B2 | 8/2011 | Staffaroni |
| 8,565,789 | B2 | 10/2013 | Staffaroni |
| 9,075,136 | B1 | 7/2015 | Joao |
| 9,158,414 | B1 | 10/2015 | Gluzberg |
| 9,452,785 | B2 | 9/2016 | Tsuneyama et al. |
| 9,547,307 | B1 | 1/2017 | Cullinane |
| 9,562,785 | B1 | 2/2017 | Racah |
| 9,599,477 | B1 | 3/2017 | Aula |
| 9,613,386 | B1 | 4/2017 | Arden |
| 9,631,933 | B1 | 4/2017 | Aula |
| 9,715,233 | B1 | 6/2017 | Mandeville-Clark |
| 9,702,714 | B2 | 7/2017 | Botea |
| 9,733,096 | B2 | 8/2017 | Colijn |
| 10,731,998 | B2 * | 8/2020 | Rahematpura ......... G01C 21/28 |
| 2004/0249818 | A1 | 12/2004 | Isaac |
| 2006/0235739 | A1 | 10/2006 | Levis |
| 2007/0150375 | A1 | 6/2007 | Yang |
| 2007/0233373 | A1 | 10/2007 | Choi |
| 2008/0275645 | A1 | 11/2008 | Hoshino |
| 2008/0277183 | A1 | 11/2008 | Huang |
| 2009/0156241 | A1 | 6/2009 | Staffaroni |
| 2009/0216600 | A1 | 8/2009 | Hill |
| 2009/0326991 | A1 | 12/2009 | Wei |
| 2011/0320232 | A1 | 12/2011 | Staffaroni |
| 2012/0004840 | A1 | 1/2012 | Lee |
| 2012/0130627 | A1 | 5/2012 | Islam |
| 2013/0073327 | A1 | 3/2013 | Edelberg |
| 2013/0132140 | A1 | 5/2013 | Amin |
| 2013/0132246 | A1 | 5/2013 | Amin |
| 2013/0159028 | A1 * | 6/2013 | Lerenc ............... G06Q 10/1095 705/5 |
| 2014/0011522 | A1 | 1/2014 | Lin |
| 2014/0129135 | A1 | 5/2014 | Holden |
| 2014/0365250 | A1 | 12/2014 | Ikeda |
| 2015/0006072 | A1 | 1/2015 | Goldberg |
| 2015/0067878 | A1 | 3/2015 | Steelberg |
| 2015/0081362 | A1 | 3/2015 | Chadwick |
| 2015/0143275 | A1 | 5/2015 | Lee |
| 2015/0161564 | A1 | 6/2015 | Sweeney |
| 2015/0219464 | A1 | 8/2015 | Beaurepaire |
| 2015/0228192 | A1 | 8/2015 | Kawamoto |
| 2015/0248689 | A1 | 9/2015 | Paul |
| 2015/0254581 | A1 | 9/2015 | Brahme |
| 2015/0278618 | A1 | 10/2015 | Nuscheler |
| 2015/0302342 | A1 | 10/2015 | Yeh |
| 2015/0339923 | A1 | 11/2015 | Konig et al. |
| 2015/0339928 | A1 | 11/2015 | Ramanujam |
| 2016/0027306 | A1 | 1/2016 | Lambert |
| 2016/0027307 | A1 | 1/2016 | Abhyanker |
| 2016/0034828 | A1 | 2/2016 | Sarawgi |
| 2016/0034845 | A1 | 2/2016 | Hiyama |
| 2016/0042303 | A1 | 2/2016 | Medina |
| 2016/0048804 | A1 | 2/2016 | Paul |
| 2016/0055769 | A1 | 2/2016 | Angelescu |
| 2016/0071411 | A1 | 3/2016 | Stenneth |
| 2016/0187150 | A1 * | 6/2016 | Sherman ........ G06Q 10/063114 705/7.15 |
| 2016/0301698 | A1 | 10/2016 | Katara |
| 2016/0320195 | A1 | 11/2016 | Liu |
| 2016/0320198 | A1 | 11/2016 | Liu |
| 2016/0321771 | A1 | 11/2016 | Liu |
| 2016/0370194 | A1 | 12/2016 | Colijn |
| 2017/0052034 | A1 | 2/2017 | Magazinik |
| 2017/0059347 | A1 | 3/2017 | Flier |
| 2017/0103490 | A1 | 4/2017 | Haparnas |
| 2017/0153714 | A1 | 6/2017 | Gao |
| 2017/0160092 | A1 | 6/2017 | Botea |
| 2017/0169366 | A1 | 6/2017 | Klein |
| 2017/0169535 | A1 | 6/2017 | Tolkin |
| 2017/0193404 | A1 | 7/2017 | Yoo |
| 2017/0213308 | A1 | 7/2017 | Wellborn |
| 2017/0277191 | A1 | 9/2017 | Fairfield |
| 2017/0286884 | A1 | 10/2017 | Shoval |
| 2017/0293950 | A1 | 10/2017 | Rathod |
| 2017/0300848 | A1 | 10/2017 | Shoval |
| 2017/0309171 | A1 | 10/2017 | Zhao |
| 2017/0314948 | A1 | 11/2017 | Tsuneyama et al. |
| 2017/0337810 | A1 | 11/2017 | Abe |
| 2017/0365030 | A1 | 12/2017 | Shoham |
| 2018/0156623 | A1 | 6/2018 | West |
| 2018/0158325 | A1 | 6/2018 | Bernhardt |
| 2018/0202820 | A1 | 7/2018 | Yu |
| 2018/0202821 | A1 | 7/2018 | Yu |
| 2018/0342035 | A1 | 11/2018 | Sweeney |
| 2018/0356239 | A1 | 12/2018 | Marco |
| 2018/0374032 | A1 | 12/2018 | Pan |
| 2019/0137288 | A1 | 5/2019 | Rahematpura |
| 2019/0306258 | A1 | 10/2019 | Yamashita |
| 2020/0160709 | A1 | 5/2020 | Ramot |
| 2020/0249042 | A1 | 8/2020 | Warr |

FOREIGN PATENT DOCUMENTS

| | | |
|---|---|---|
| JP | 2010-208195 | 8/1998 |
| JP | 3934985 | 6/2007 |
| JP | 2012-73995 | 4/2012 |
| JP | 2004-073639 | 5/2015 |
| WO | WO 2002006994 | 1/2002 |
| WO | WO 2014074407 | 5/2014 |
| WO | WO-2014106617 | 7/2014 |

OTHER PUBLICATIONS

IPRP in PCT/US2015/043654 dated Feb. 16, 2017.
International Search Report in PCT/US2016/066030 dated Feb. 28, 2017.
Written Opinion in SG 11201700671P dated Oct. 13, 2017.
EESR in EP 15830335.4 dated Nov. 29, 2017.
IPRP in PCT/US2016/066030 dated Jun. 21, 2018.
2nd Written Opinion in SG 11201700671P dated Aug. 29, 2018.
ESER in EP 16874019.9 dated Aug. 22, 2018.
ISR and Written Opinion in PCT/US2018/013583 dated Apr. 20, 2018.
ISR and Written Opinion in PCT/US2018/059230 dated Jan. 2, 2019.
Andrew J. Hawkins, Lyft is now suggesting more convenient pickup locations, because a little walking won't kill you. Jun. 26, 2017 The Verge (www.theverge.com).
Office Action in EP 15830335.4 dated Mar. 21, 2019.
Office Action in JP 2017-505856 dated Feb. 6, 2019.
Mark H. Walker, "Microsoft Office Visio 2003 Official Manual", Initial Pressing, Nikkei BP Soft Press, Apr. 4, 2005, First Edition, pp. 423-425.
ISR dated Oct. 3, 2018 in PCT/US2018/039830.
Borison, Rebecca, "Uber Brings its SUV Fleet to NYC", Jul. 30, 2014, Business Insider, p. 1.

(56) References Cited

OTHER PUBLICATIONS

Hilen, Brittany, Uber and Google bring WIFI to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326.
Jain, "Contextual Adaptive User Interface for Android Devices", Annual IEEE India Conference (INDICON), IEEE, pp. 1-4 (2013).
IPRP in PCT/US2019/039830 dated Jun. 26, 2019.
Pelzer, et al., "A Partition-Based Match Making Algorithm for Dynamic Ridesharing", IEEE Transactions on Intelligent Transportation Systems, vol. 16, Issue: 5, pp. 2587-2596 (2015).
Office Action in EP 15830335.4 dated Nov. 21, 2019.
First Office Action in CN 201580043970 dated Apr. 22, 2020.
Pre-Examination Office Action in BR 112017002174-9 dated May 6, 2020.
Examination Report No. 1 for AU 2015301178 dated Jun. 11, 2020.
Office Action in EP 16874019.9 dated Jun. 9, 2020.
Pre-Exam Office Action in BR 112018011694-7 dated Jul. 13, 2020.

\* cited by examiner

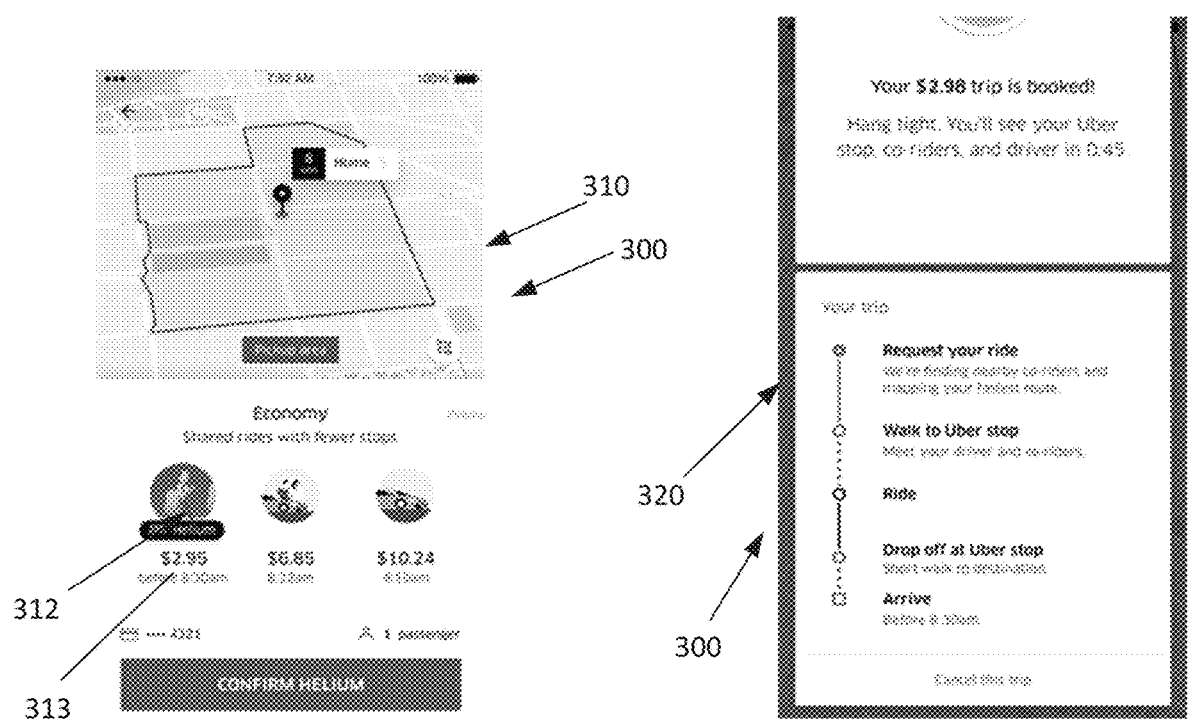
FIG. 3A
FIG. 3B
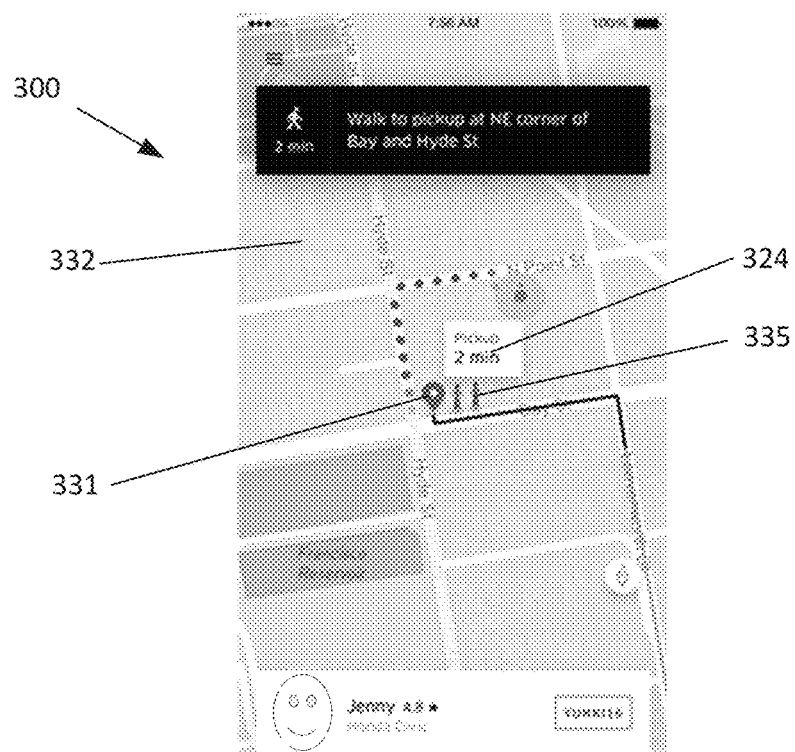
FIG. 3C

NETWORK COMPUTER SYSTEM TO ARRANGE POOLED TRANSPORT SERVICES

RELATED APPLICATIONS

This application is a continuation of U.S. patent application Ser. No. 16/179,841, filed on Nov. 2, 2018; which claims benefit of priority to Provisional Application No. 62/581,765, filed Nov. 5, 2017; the aforementioned applications being hereby incorporated by reference their respective entireties.

TECHNICAL FIELD

Examples described herein relate to a network computer system to arrange pooled transport services.

BACKGROUND

Numerous on-demand services exist to offer users a variety of services: transportation, shipping, food delivery, groceries, pet sitting, mobilized task force and others. Typically, on-demand services leverage resources available through mobile devices, such as wireless (e.g., cellular telephony) devices, which offer developers a platform that can access sensors and other resources available through the mobile device. Many on-demand services include dedicated applications (sometimes referred to as "apps") to communicate with a network service through which an on-demand service is offered.

BRIEF DESCRIPTION OF THE DRAWINGS

FIG. 3A through FIG. 3E illustrate computing interfaces for use with one or more examples of FIG. 1.

DETAILED DESCRIPTION

Figure 1:
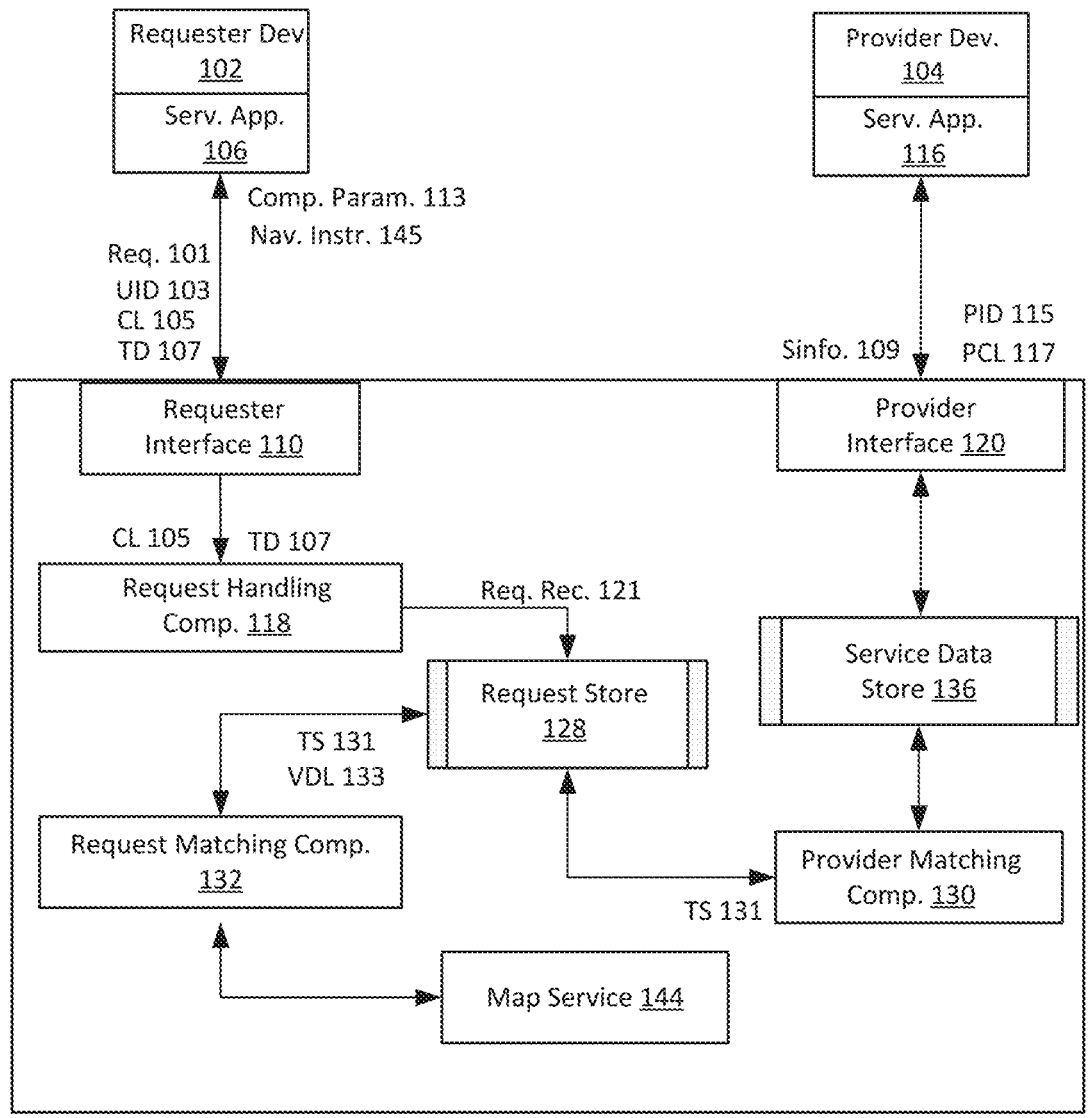
FIG. 1 illustrates an example of a network computing system for arranging pooled transport services.

A network computer system operates to receive a plurality of service requests over a given time interval, where individual service requests specify a respective target destination and a current location of a respective requester device. For each service request, the network computer system arranges a pooled transport service for the corresponding requester by selecting a service start location, and instructions for enabling the requester to travel to the service start location. The network computer system may select the service provider based on a variety of considerations, including the service start location, the current location of the corresponding service provider, and the determined time interval.

As used herein, a client device refers to devices corresponding to desktop computers, cellular devices or smartphones, wearable devices, laptop computers, tablet devices, television (IP Television), etc., that can provide network connectivity and processing resources for communicating with the system over a network. A driver device can also correspond to custom hardware, in-vehicle devices, or on-board computers, etc. The client device and/or the driver device can also operate a designated application configured to communicate with the system 100.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

FIG. 1 illustrates an example network computing system for arranging on-demand pooled transport services. In an example of FIG. 1, network computing system 100 includes functionality to coalesce service locations for on-demand pooled transport services, in order to promote objectives of minimizing route deviation and/or time expended on the part of service providers and vehicles for pooled on-demand transport services.

According to some examples, the network computing system 100 is implemented as a network service. Accordingly, the network computing system 100 may be implemented on, for example, one or more servers or other network computer machines. The network computing system 100 may be implemented as part of a transport arrangement service, which operates to match incoming transport service requests from requester devices with service providers who are available and in proximity to the start location of the service request. In variations, the network computing system 100 can be implemented as a separate or standalone service that can interface with a transportation arrangement service or user device (e.g., via a service application for the network service). Still further, in other variations, the network computing system 100 can be implemented at least in part on individual user devices. For example, functionality described with the network computing system 100 may be implemented as part of a service application that runs on mobile devices of individual requesters.

With respect to examples as described, the network computer system 100 can be implemented on a server, on a combination of servers, and/or on a distributed set of computing devices which communicate over one or more networks, including one or more types of cellular networks, as well as the Internet. Still further, some examples provide for the network computing system 100 to be distributed using one or more servers and/or mobile devices. In some variations, the network computing system 100 is implemented as part of, or in connection with a network system, where, for example, operators use service vehicles to provide transport-related services between locations. In variations, the network computing system 100 can be implemented using mobile devices of users, including service providers and requesters, with the individual devices executing a corresponding service application that causes the computing device to operate as an information inlet and/or outlet for the network computing system 100.

Accordingly, some or all of the components of the system 100 can be implemented on network side resources, such as on one or more servers. In variations, the system 100 can be implemented through other computer systems in alternative architectures (e.g., peer-to-peer networks, etc.). In operation, system 100 receives service requests 101 from requester devices (as represented by requester device 102), and communicates with provider devices (as represented by provider device 104) to implement functionality such as matching service providers to service requests. The system 100 may provide different types of transport services, including pooled transport services. In a pooled transport service, multiple requesters may concurrently receive transport from one service provider and vehicle.

Accordingly, in some examples, the network computing system 100 can communicate with the requester and provider devices 102, 104 to receive information that is (i) specific to the location of each user, and (ii) contextual to reflect a real-world condition or event occurring at a particular time (e.g., a status of a service provider or requester), in regards to the user of the requester or provider device 102, 104 from which information is gathered. As further described, the communications between the network computing system 100 and the requester and provider devices 102, 104 can be in the form of information sharing, as well as programmatic control (e.g., server of the network computing system causing a process on the respective user device to be triggered, and/or performed in a particular manner). In implementing programmatic control, the network computing system 100 can deliver, or alternatively utilize, scripts or other operative coding that reside on the particular device, so as to give the network computing system 100 presence on the particular device. In this respect, the network computing system 100 can implement, or alternatively utilize, a distributed architecture of devices, software components, or processes (which may exist temporarily or otherwise on the respective device). By way of example, the network computing system 100 (e.g., through use of one or more servers) can trigger an information gathering process to be performed on a respective requester or provider device 102, 104, where the executed process, when communicated on the particular device, causes the device to access other functionality, such as provided with a satellite receiver (or other location-aware resource), sensor (e.g., accelerometer, gyroscope, camera, microphone, etc.), application, or remote resource of that device (e.g., network information channel of the respective device). In this respect, the network computing system 100 can control when such information gathering processes are performed (such as in response to specific events and/or at a particular frequency), and under what circumstances information gathering processes are performed (e.g., after service provider toggles a user-interface feature to go online, and/or be available, or when a respective service application is launched on the user device). The network computing system 100 can also generate prompts for users, in response to information obtained from the user device, in order to obtain information that is specific to, for example, context and/or location of an activity that the user is performing and that is relevant to the transport arrangement service (e.g., service provider operating a vehicle).

Accordingly, in some examples, the network computing system 100 can, in combination with the provider and/or requester devices 102, 104, form an information and determination system 10, where the information and determination system 10 includes, for example, a network computer system (e.g., a logically centralized set of servers and/or server processes, including those of the network computing system 100), and a distribution of computing devices, where the distributed computing devices operate as information gathers, as well as outlets for determinations of the network computing system 100. As described further, the information gathered from the provider and/or requester devices can be utilized to make determinations that can promote service objectives with respect to the manner that pooled transport is provided to a group of requesters, specifically with respect to, for example, reducing or minimizing vehicle route deviation and trip duration to accommodate requesters in the context of on-demand pooled transport. In some examples, the network computing system 100 can implement outcomes, directly or indirectly, through communications of information and signals to provider and/or requester devices 102, 104. With regard to specific examples described, the network computing system 100 can generate, as outcomes, selection of service locations for pooled transport requesters, ambulatory navigational instructions and content for requesters, matching of service requesters or vehicles to pooled transport requests, and/or communications to service providers regarding matched service requests.

According to an example, the system 100 includes a requester interface 110, a provider device interface 120, and a provider matching component 130. The requester interface 110 includes or performs processes that run on the network-side of the system 100 to establish communication channels with requester devices 102. Likewise, the provider device interface 120 includes or performs processes that run on the network-side of the system 100 to establish communication channels with provider devices 104. The system 100 can communicate, over one or more networks, over with requester and provider devices, using processes represented by the requester interface 110 or provider interface 120, respectively.

The requester device 102 and provider device 104 can communicate with system 100 over one or more networks using, for example, respective designated service applications 106, 116. In examples, the service applications 106, 116 of the respective requester and provider devices 102, 104 can each correspond to a program (e.g., a set of instructions or code) that is downloaded and stored on the respective device. According to some examples, the applications can include or use an application programming interface (API), such as an externally facing API, to communicate with the system 100 via the respective requester device 102 or provider device 104. The externally facing API can provide access to system 100 via secure access channels over the network through any number of methods, such as web-based forms, programmatic access via restful APIs, Simple Object Access Protocol (SOAP), remote procedure call (RPC), scripting access, etc.

A requester may operate requester device 102 to establish a communication link with the system 100. In an example, when the service application 106 is launched on the requester device 102, the service application 106 transmits a user identifier 103 of the requester to the system 100. The requester interface 110 associates the requester identifier with a corresponding user account, as well as a user profile and other information specific to the user identifier 103. As described with various examples, the service application 106 may generate a service request 101 that is received by the system 100 via the requester interface 110. In generating the service request 101, the service application 106 may access a satellite receiver or other location-aware resource of the requester device 102, to obtain and transmit the current location 105 of the requester device 102 to the system 100. The service application 106 may associate the service request 101 with a current location of the requester device 102 using the position information obtained from the location-aware resource of the device. The requester may also specify a set of service parameters in connection with the service request 101, including a target destination 107 (e.g., drop-off location) for the service request 101.

Other examples of service parameters which the requester may specify with the service request 101 include a service type, such as a user selection of a pooled or singular transport. The selection of service type can be made manually, by the requester, using an interface provided through the service application 106 (e.g., upon launch of the service application 106). Alternatively, the service type can be pre-selected for the requester as a default setting, such as based on a preference of the requester, or the requester's most recent selection. The selection of service type can also cause the service application 106 to specify additional parametric information with the service request 101. For example, in the context of on-demand pooled transport, the additional parametric information can include (i) a setting or preference of the use as to a length of ambulatory travel (e.g., maximum distance the requester is willing to walk), and/or (ii) a time constraint, such as a required arrival time for the requester to reach a destination.

When the service application 106 is opened on the requester device 102, the requester's identifier 103 and current location 105 may be recorded with the active service data store 136. As described, the requester's current location 105 may be used to provide the requester with service information, such as the availability of service providers, and the cost for receiving one or more types of transport service at the current location of the requester.

Similarly, a service provider may use the service application 116 on the provider device 104 to establish a communication channel with the system 100. Once the communication channel is established, the provider device 104 may repeatedly or continuously communicate service information 109 to the system 100. The service information 109 may include, for example, the provider's identifier 115, as well as the provider's current location 117, which may be determined by the service application interfacing with a satellite receiver of the provider device 104.

The service data store 136 maintains the current location 117 of each active service provider at a particular moment. By way of example, each service provider may start a shift by operating the service application 116 (e.g., opening the application on the provider's device 104), and then toggling a state feature provided by the service application 116 to 'on duty'. The service application 116 communicates the activation of the state feature to the system 100 via the provider device interface 120. The provider device interface 120 processes the service information 109 received from individual service providers. For each service provider, the provider device interface 120 extracts the current location 117 and stores the current location with the provider's identifier 115 in the service data store 136. As the service provider's location changes (e.g., with movement of the service provider's vehicle), subsequent communications from the provider device 104 via the provider device interface 120 can be used to update the service data store 136. In this way, the service data store 136 may reflect the most current location 117 of each service provider.

The service data store 136 may also associate a service state with each provider. Initially, when the service provider goes on duty, the service provider may be associated with a service state in which the service provider is deemed to be available for matching to a service request. Once the service provider is matched to a service request 101, the associated state of the service provider may change, to reflect, for example, an unavailable state, or any one of multiple possible unavailable states (e.g., on-trip, on route to service start, etc.). In some examples, some service providers may provide pooled transport services, where the provider provides transport to multiple requesters concurrently. In such cases, the service provider can have multiple states of availability, reflecting, for example, situations in which the service provider is unoccupied (e.g., has two seats available), partially occupied (e.g., has one seat available, and one seat occupied) or is fully occupied (e.g., has no seats available).

The provider matching component 130 matches service requests 101 with available providers based on a variety of factors. According to some examples, the provider matching component 130 selects a service provider from the service data store 136 based on factors such as the proximity of service provider (e.g., based on the current location 117 of the service provider and the determined service start location 131 for the service request 101) and the availability of the service provider, as provided by the service state of the provider. As described in greater detail, the provider matching component 130 can also select the provider based on a projected arrival time of the service provider to a service start location 131. The provider matching component 130 can use, for example, a mapping service 144 to estimate parameters such as the service provider's arrival time at the service start location 131, based on factors such as the current location of the service provider, the service start location, and a predicted route of the service provider.

In some examples, the service request 101 can be in the form of a pre-request. The pre-request can be generated automatically, or in response to some user event (e.g., user launches application or selects to view a service request application page), for purpose of providing the user with information about available transport services. In such examples, the service request 101 may be generated automatically by the service application 106 running on the requester device 102, responsive to an event such as the launch of the service application 106, and/or a user input that detects user interest. The information that is determined and provided to the user through the service application 106 can be selected to facilitate a decision making process of the user. For example, the information that is returned to the user can facilitate the user in determining when to make a transport request, and/or what type of transport service to request. In specific examples, the information can indicate price for transport, arrival time of service provider to a given start location, and/or commute time for an expected or specific trip. The information may further be specific to one or more types of transport services (e.g., pooled transport, luxury transport, etc.). Still further, the provided information can be provided for multiple types of transport service, so as to enable the requester to compare the services. The service application 106 may generate the service request 101 as a pre-request using, for example, the user's current location for determining the service start location. As another example, the service request 101 may be generated in the form of the pre-request as a response to the user entering a destination inquiry with respect to a particular type of transport service.

When the service request 101 is communicated as a pre-request, the system 100 may generate a set of completion parameters 113 for the user, where the completion parameters 113 include, for example, one or more of a service completion time (e.g., expected time until requester arrives at a corresponding destination), trip time (e.g., expected duration for traveling between a given start location and destination), arrival time (e.g., time when the requester arrives at a final destination), distance traveled, expected fare for receiving transport service and/or other information. Depending on implementation, the completion parameters 113 can be determined as either an estimate or as a commitment (e.g., upfront fare or maximum fare) from system 100 with respect to transport that is arranged for the requester. In this way, the completion parameters 113 provide the user with information from which the user can make a decision to request service, as well as a type of service. In some examples, the completion parameters 113 may be determined by, for example, real-time information, such as the number of service providers that are available in the given region, and/or the number of requesters in the given region (e.g., users running the service application 106 on their respective devices). As an addition or variation, information for the completion parameters 113, including expected trip time, arrival time at destination, distance traveled and/or fare can be determined from observing traffic conditions, and/or monitoring existing service providers to determine travel times etc. In some variations, the completion parameters 113 can also be determined from historical data for comparable service requests. For example, completion parameters 113 for a service request at a current instance of time may be based on historical information, determined from prior service requests that have specified similar start locations and destinations, in comparable time periods (e.g., day or week, time of day, etc.).

According to some examples, when pooled transport services are provided by the system 100, the system 100 may implement functionality to optimize for, or otherwise promote objectives that are specific for pooled-transport services. In context of on-demand pooled transport services, the objectives can be directed to reducing travel time or duration, for service providers and vehicles, and/or requester(s). By way of example, optimization objectives for pooled-transport services may provide for (i) reducing the number of stops which a service provider or vehicle makes in order to accommodate multiple requesters at one time, (ii) maximizing an amount of service time during which a service provider or vehicle has multiple (or a maximum number of) passengers on board, and/or (iii) minimizing an amount of route deviation a service provider or vehicle is subjected to in picking up or dropping off a requester during pooled transport. Moreover, the optimization objectives for pooled-transport services may be implemented on a group level, meaning the determinations are made to optimize the objective for a group of service providers and/or requesters, such as for all available service providers in a given time interval, and within a given range of a geographic sub-region.

In some examples, the request handling component 118 initiates an action, or set of actions, to coalesce the service locations for on-demand pooled transport services. As described with various examples, the coalescing of service locations can be in the form of matching service requests (for pooled transport services) based on service start location (e.g., pickup location) and/or vehicle disembark location (e.g., drop-off location). To promote matching of service locations, the system 100 can select service locations for requesters, and further impose requirements on individual requesters with respect to using the selected service locations. In exchange for using a selected service location, the requester may receive a benefit such as a reduced price for transport. By way of example, the requirements which may be imposed on service requesters can include (i) a requirement that a requester be present at a given service start location during a particular time interval (e.g., within 5 minutes, or at a particular time); and/or (ii) a requirement that the requester independently travel to reach the service start location, or to reach their requesters intended destination.

In examples, the request handling component 118 can aggregate service requests that are received by system 100 over given time intervals, based on geographic sub-regions that relate to the request (e.g., pickup location or current location of requester) or drop-off location. In an example of FIG. 1, the request handling component 118 can aggregate service requests in a request store 128. From the aggregated service requests, the request handling component 118 can coalesce service requests 101 into, for example, pairs or triplets, based on determinations that the coalesced service requests can share a service location. In this way, the request handling component 118 can aggregate service requests 101 with an objective of maximizing a number of requests which can be coalesced, subject to a set of constraints, including one or more constraints that define a threshold distance for the requester to walk or otherwise travel (e.g., by skateboard, scooter, bicycle, etc.). In examples, the constraints may set limits for (i) the amount of time which an individual requester has to wait to receive transport service, (ii) a distance a requester has to travel (e.g., walk) from their respective current location to reach an assigned service start location, and/or (iii) a distance the requester has to travel from the drop-off location of the provided transport in order to reach their intended destination.

In an example, the request handling component 118 generates and stores an active request record 121 with the request store 128. The request record 121 can be updated via the requester interface 110 or other components of system 100, to identify stages of the service request 101 while the request is active (e.g., being matched, serviced or monitored).

In examples, the request matching component 132 selects suitable service start locations 131 and/or vehicle disembark locations 133 for incoming service request 101. For a given service request 101, the selection of a service start or vehicle disembark location 131, 133 can be in furtherance of service objectives of system 100 for pooled transport. The request matching component 132 may match service requests 101 by respective service start and vehicle disembark locations 131, 133, so as to coalesce pickup and drop-off locations of requesters who share a pooled transport service. Thus, while an incoming service request 101 may be associated with the requester's current location 105 and target destination 107, the request matching component 132 can determine service start and/or vehicle disembark locations 131, 133 which are different than the respective current location and/or specified destination of the service request.

In an example, the request matching component 132 periodically scans the request store 128 to match request records 121, corresponding to respective service requests received by the system 100. The matching may include matching multiple service requests to a common pickup location (e.g., service start location 131), and/or matching multiple service requests to a common drop-off location (e.g., vehicle disembark location 133). In some variations, the request matching component 132 matches service requests 101 with trips that are in progress (e.g., service vehicle providing pooled transport for requester, with service vehicle having occupancy), based on a planned or acceptable route for the matched service vehicle. Still further, the request matching component 132 can match a service request to a predetermined route that is in actual or likely use by one or more available transport providers, and the selected service location can be a location that is on the predetermined route, or alternatively, an acceptable deviation to the predetermined route.

In some examples, the request record 121 may reflect stages that include: (i) a preliminary stage, when a trip matching process is performed to match the service request to a service start location 131, (ii) a trip stage, where the service request is matched to a service provider based on the service start location 131 and/or other parameters, and (iii) a departure stage where the requester arrives at the vehicle disembark location 133 and travels to their target destination 107.

In the preliminary stage, the request handling component 118 responds to the service request 101 by identifying a location or direction of travel for the requester to reach a service start location 131. The request handling component 118 can use the map service 144 to determine, for example, a route (e.g., walking route) and bearing which the requester should take to reach a service start location 131. The request handling component 118 can respond to an incoming service request 101 by communicating navigation content 145 to the requester device 102 via the requester device interface 110. In some examples, the request handling component 118 initiates a request matching process using the request matching component 132 while the requester is traveling towards an undetermined service start location 131. Thus, the navigation content 145 may be communicated before the service start location 131 is selected. For example, the requester can generate the service request 101 from the requester device 102, and the system 100 can respond by communicating ambulatory navigation instructions to the requester device. The ambulatory navigation instructions can identify, for example, bearing or path for the requester to follow to reach the service start location 131. In examples, an aspect or portion of the ambulatory navigation instructions (e.g., direction for requester to begin walking) can be communicated to the requester device 102 before the service start location 131 is determined. As an addition or variation, the requester may be provided navigation content 145 (e.g., ambulatory navigation instructions) to reach a preliminary location that is designated as the service start location 131. The request handling component 118 may change the designation of the preliminary location if the request matching process identifies a second location for designation as the service start location 131, based on suitability factors such as (i) the second location being matched or matchable to another transport request, (ii) the second location being matched or matchable to a route of an actual or likely transport service, and/or (iii) the second location being easier to reach by a selected service provider.

The request matching component 132 may initiate a process to match requests to one another. In variations, the request matching component 132 can implement processes to match individual service requests 101 to specific service start locations 131. Still further, the request matching component 132 can implement processes to match individual service requests to vehicle disembark locations 133. In some examples, the request matching component 132 implements processes to match service requests during an initial service request matching time interval ("request matching time interval"), in order to identify trip start and/or vehicle disembark locations 131, 133 for respective service requests. The request matching time interval can correspond to predetermined intervals, such as discrete time slots during an hour of a day. Alternative, the request matching time interval can be based on events, such as the receipt of a service request, or a threshold number of service requests over a given interval of time. In some examples, the request matching time interval includes a minimum threshold of time that permits the requester to walk or otherwise travel to the matched service start location 131. For a given service request, the request matching process can be performed repeatedly, for individual service requests, during the request matching time interval, in order to match the service request 101 to another service request by either the service start location 131 or the vehicle disembark location 133. Thus, the location matching time interval enables the request matching component 132 of the request handling component 118 to coalesce service start and/or vehicle disembark locations 131, 133 with respect to service requests that are received during a request matching time interval.

In examples, the request matching component 132 can select the trip start and/or vehicle disembark location(s) 131, 133 for the service request 101 to be along a common roadway or route that suitably services each requester of the pooled transport. In this way, the respective service start and/or vehicle disembark location(s) 131, 133 of multiple requesters in a given region can be aligned directionally, and/or by route, along a common roadway or route. By aligning the service start and/or vehicle disembark locations 131, 133, the request matching component 132 can minimize route deviation that would otherwise occur as a result of a service provider picking up or dropping off a requester when another requester is also in the vehicle.

In variations, the request matching component 132 can select the service start and/or vehicle disembark location(s) 131, 133 using map service 144. The map service 144 can identify a service start location which satisfies a distance threshold or criteria (or multiple distance criteria). For example, a selected service start location may satisfy a condition of being within a threshold distance (e.g., travel distance, total distance, walking distance, etc.) from the current location 105 of the requester.

In variations, historical information may be maintained by, for example, the map service 144 regarding the suitability of intersection corners and other locations, for purpose of service start locations and/or destinations. The historical information can be obtained from recent or relevant time periods, and it may include information such as (i) common routes taken by pooled transport providers in a recent or relevant time period, (ii) the location of requesters when pooled transport services are requested, for the given geographic sub-region, (iii) the desired final destination of requesters who receive the pooled transport service, (iv) traffic conditions, and/or environmental conditions which may affect the usability of specific service locations for pickup and drop-off off passengers, (v) feedback from service providers and/or requesters, regarding the suitability or convenience of individual service locations (e.g., intersections), such as at a particular time-of-day, and/or (vi) metrics relating to actual service locations that were used. In the latter case, the metrics may identify, for example, the number of times a service selection was used, the number of times the service vehicle missed the requester at the service location, the number of times the requester was not able to reach the service location in time.

In some examples, the request matching component 132 can determine the service start location 131 by matching the user's current location to a known or suitable service start location that is provided on a common roadway or route. In determining the service start location 131, the request matching component 132 can determine a heading or general direction of travel for the service request, given the current location of the requester. For example, the request matching component 132 can utilize the map service 144 to determine the heading of the requester based on the requester's location 105 and the target destination 107. In some examples, the request matching component 132 selects the service start and/or vehicle disembark locations 131, 133 from a set of predetermined locations. Still further, the service start and/or vehicle disembark locations 131, 133 can be selected to be intersection corners. For example, the service start location 131 may be selected from a set of predetermined intersection corners that are within a threshold distance of the requester's current location 105. From the predetermined set, the intersection corner that may be selected as the service start location 131 can correspond to the closest intersection corner which matches the heading of the requester's direction of travel. For example, the map service 144 can identify eight corners for a four-way intersection, with each of the corners being associated with a roadway and heading. At the same time, the map service 144 may exclude intersection corners which, for example, satisfy the proximity threshold but violate some other rule or constraint (e.g., intersection on steep hill, intersection corner unsafe to reach, etc.). In some examples, the request matching component 132 can identify the nearest intersection corner that is deemed to be on a suitable roadway and which does not violate any other rules or constraints.

While selecting the service start location 131 at an intersection corner can align the service request 101 with a common route or roadway, the request matching component 132 can also implement a process to coalesce service start locations 131 of multiple requesters, so that a single vehicle can pick up two or more requesters at one service start location 131. By coalescing the service start locations 131 of multiple service requests, the request matching component 132 can reduce the number of stops a service provider makes when providing the pooled transport. In some examples, the request matching component 132 can make a preliminary determination of whether a newly received service request 101 can be matched by a service start location that is specified or determined for another service request 101. The request matching component 132 can match a newly received service request 101 to a service start location 131 of an active record 121 of another request if distance, timing and availability conditions are met. A distance condition may be met if the trip start location 131 of the active request is within a threshold distance of the new requester's current location. A timing condition may be met if the new requester has sufficient time to travel to the existing trip start location. Additionally, availability conditions may be met if the number of service requests that are matched to one another (e.g., assigned to the same vehicle) at the service start location 131 is less than a designated threshold set by the size of the pooled transport vehicle. In many instances, for example, a limit of two service request can be coalesced by service start locations 131.

As an addition or variation, the service request 101 may also have to meet a user-specified or requisite condition. For example, a requester may specify a preference to not be matched with requesters who utilize mobile telephonic devices in vehicles, and based on the preference, the request matching component 132 may not match two requesters despite other conditions which would otherwise lead to the two requesters being matched at a coalesced service start location 131.

In a variation, the request matching component 132 can utilize the map service 144 to preselect suitable intersection corners or pickup locations based on factors such as driver convenience and ease of access. In such variations, the request matching component 132 can select the predetermined service location that is closest to the current location of the requester. The selection of the respective service start and vehicle disembark location(s) 131, 133 can also be based on additional suitability criterion, such as the accessibility of the respective service start and vehicle disembark location(s) 131, 133 to the service provider, the ability of the service provider to stop at the particular location, and/or the frequency of use of the roadway on which the location resides for service providers and requesters.

Additionally, the request matching component 132 can select vehicle disembark locations 133 for requesters of pooled transport, based on the target destination 107 of the service request 101. For example, the service request 101 may specify a street address of a business where the requester's works. In response, the request matching component 132 can select a vehicle disembark location 133 for the requester, where the vehicle disembark location 133 is different than the requester's target destination 105. In examples, the vehicle disembark location 133 is selected as a suitable intersection or predetermined location on a route of the service provider, where the intersection or location satisfies a proximity condition (e.g., within a threshold distance) with respect to the target destination 107 of the service request 101. For example, the request matching component 132 can select the vehicle disembark location 133 from a predetermined set of intersection corners (e.g., as identified by the map service 144), based on the proximity (e.g., closest intersection corner of the predetermined set) and heading of the service provider when providing the service.

Additionally, the request matching component 132 can align (by route or heading) or coalesce vehicle disembark locations 133 for individual requesters that share a pooled transport, with the assumption that one or both requesters may have to walk or otherwise travel (e.g., through public transport) to their desired destination. In some cases, the request matching component 132 can match service requests 101 based on the specified destinations of the respective service requests when, for example, the vehicle disembark locations 133 is coalesced to one location. In other variations, the request matching component 132 may select vehicle disembark locations 133 for matched service requests in a manner that aligns the matched service requests along a common roadway or route. In this way, the request matching component 132 can minimize route deviation that would otherwise occur when one requester is transported to a requested destination that is off-route with respect to another requester who is receiving transport in the same vehicle.

In the trip stage, the provider matching component 130 matches the service request 101 with available providers based on a variety of factors. According to some examples, the provider matching component 130 selects a service provider from the service data store 136 based on factors such as the proximity of the service provider to the service start location 131 (e.g., based on the current location 117 of the service provider and the determined service start location 131 for the service request 101) and the availability of the service provider, as provided by the service state of the provider. The provider matching component 130 may also select the provider based on an arrival time of the service provider to the service start location 131. The provider matching component 130 can use the mapping service 144 to estimate parameters such as the service provider's arrival time at the service start location, where the service provider's arrival time can be based on, for example, the current location of the service provider, the service start location, and a predicted route of the service provider.

In some examples, the request handling component 118 triggers the provider matching component 130 to initiate matching for individual service requests 101 to available service providers. In some examples, the request handling component 118 associates a pickup time or window with the request record 121 of the requester, where the pickup time is static. The request handling component 118 may also trigger the provider matching component 130 by monitoring the location of the requester as the requester progresses towards the service start location 131. Thus, if the requester progresses on a skateboard to the service start location 131, in some variations, the request handling component 118 anticipates the early arrival of the requester at the service start location 131, and triggers the provider matching component to match for the service record 121.

As an addition or variation, the request handling component 118 triggers the provider matching component 130 to locate a service provider based on an estimated time for a service provider to arrive at the service start location 131. The provider matching component 130 can estimate the arrival time based on, for example, a number of available requesters in the region of the service start location 131. In such examples, the number of available requesters can be determined from, for example, the requester device interface 110 tracking and counting the number of requester devices 102 in the region. As an addition or alternative, the number of available requesters can be determined from historical information relating to, for example, arrival times of service providers to specific service start locations, vehicle disembark locations, and/or the number of requesters, in prior time periods. Since the service request is to occur in an upcoming time interval and at know sub-regions, in some variations, the provider matching component 130 can implement operations to plan for provisioning for service start locations 131 in the upcoming time interval, in order to plan timely arrivals by service providers at the respective service start locations 131.

While some examples provide that the vehicle disembark location 133 is determined before the respective transport is started for the requester, in variations, the vehicle disembark location 133 can be determined as the requester is receiving the transport service. In some examples, the request handling component 118 may monitor the active request store 128 trip as the requester's trip progresses towards the planned vehicle disembark location 133. If the request handling component 118 identifies a service request or trip start of another user that is sufficiently near the vehicle disembark location 133 of the requester on trip, the request handling component 118 may change the vehicle disembark location 133 so that the vehicle disembark location of the existing rider matches the trip start location of the second rider. The matching of vehicle disembark location 133 of a first rider to trip start location of a second rider further reduces the number of stops which the service provider is subjected to.

Methodology

Figure 2:
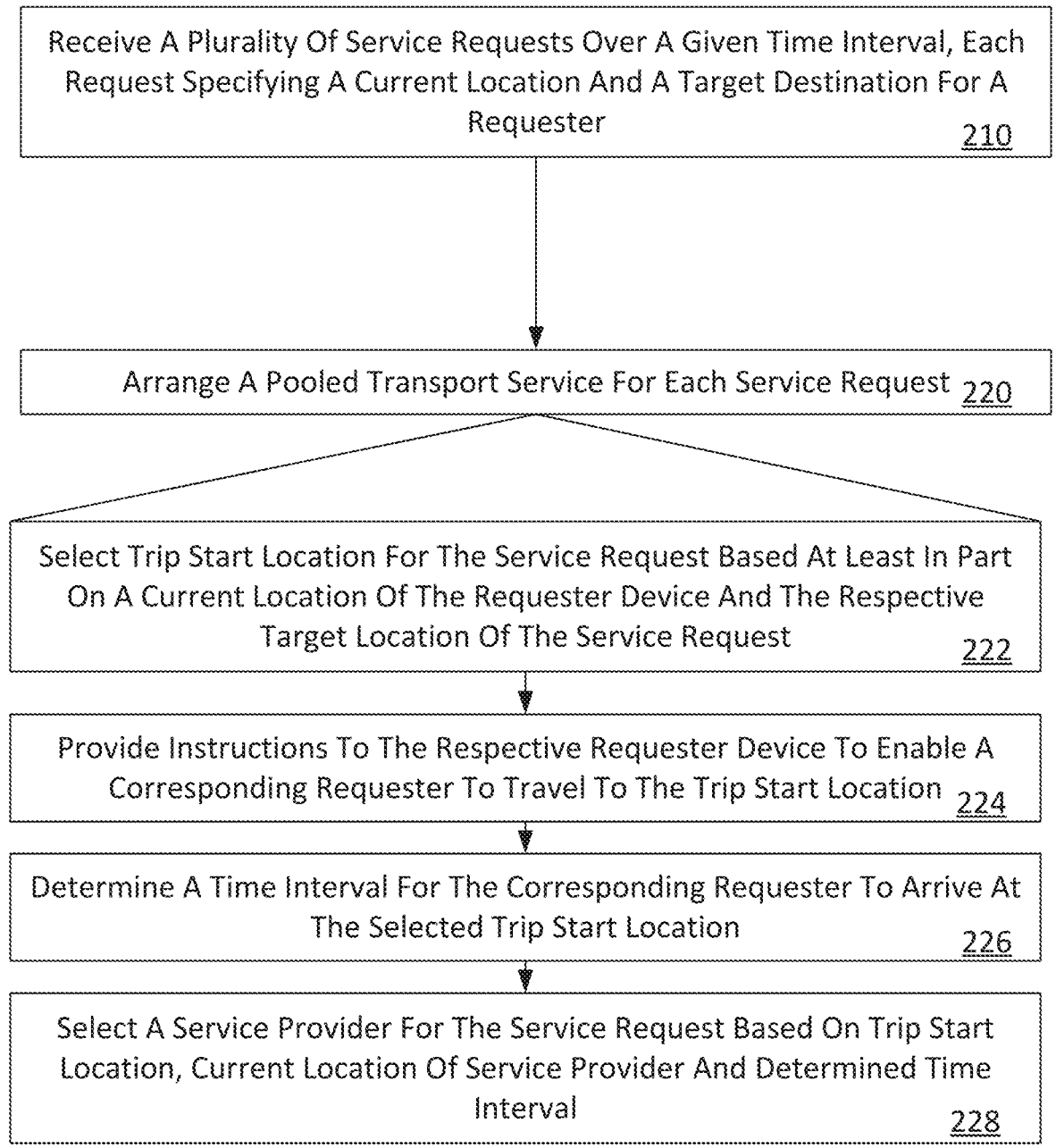
FIG. 2 illustrates an example method for arranging pooled transport services.

FIG. 2 illustrates an example method for arranging pooled transport services. An example method such as described may be implemented using a system such as described with an example of FIG. 1. Accordingly, reference may be made to elements of FIG. 1 for purpose of illustrating a suitable component or element for performing a function or operation being described.

With reference to FIG. 2, the system 100 receives multiple transport requests for pooled transport over a given time interval, where each transport request specifies a target destination and a current location of the requester (210). The requester may operate service application 106 to generate the service request for pooled transport. The service application 106 may automatically interface with a satellite receiver, or other location-aware resource of the requester device 102, in order to determine location information (e.g., the current location of the requester) for the transport request.

The system 100 may arrange a pooled transport service for individual requests by selecting a service start location for the transport request (220). The service start location may correspond to the location where the requester enters a vehicle of the service provider to receive transport. The system 100 may select the service start location for individual transport requests based on the location of the request at the time when the request is made, as well as the target destination of the transport request (222). As described with some examples, the current location and target destination may be used to select an intersection corner as the service start location 131, based on proximity and the heading of the requester's planned trip. The selection of the service start location 131 may be based on identifying suitable start locations (e.g., intersections) that fall within a threshold distance (e.g., walking distance). As described with some examples, the threshold distance may vary for a sub-region over time, and between sub-regions, depending on availability of service providers and the number of requesters.

The system 100 may provide instructions to individual requester devices, to enable corresponding requesters to travel to the service start location (224). By way of example, the system 100 may provide the requester device with walking instructions to arrive at the service start location 131.

As the requester travels (e.g., walks, skateboards) to the service start location, the system 100 may determine a time interval for the corresponding requester to arrive at the selected service start location (226). In some examples, the time interval may be fixed. In variations, the time interval may be dynamic, and subject to change based on, for example, the travel pace of the requester to the service start location. By way of example, the time interval may account for a maximum walking time of the requester. More generally, the time interval may be selected to target arrival of the requester to the target destination before a predetermined time.

The system 100 may select a service provider for the service request 101, based at least in part on the service start location, the current location of the corresponding service provider, and the determined time interval (228). As described with various examples, the system 100 may utilize a portion of the time period to match individual service requests to other service requests. Thus, for example, two requesters may be situated at a service start location.

Figure 3D:
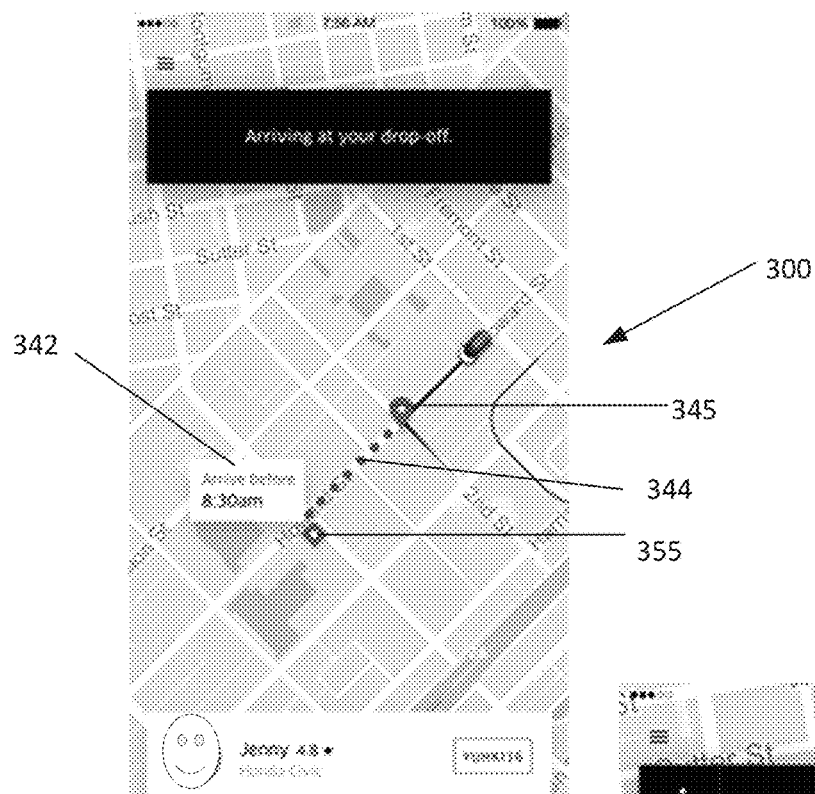

FIG. 3A through FIG. 3E illustrate computing interfaces for use with one or more examples of FIG. 1. In FIG. 3A, a user interface 300 includes a request panel 310 on the requester device 102 to enable a requester to choose a transport service type. The user interface 300 may be generated using, for example, the service application 106, using data communicated from the system 100 to the requester device 102. A pooled transport service may be one of multiple transport types that are available (e.g., using icon 312). For a given destination (e.g., the requester's home address), the user interface 300 may display service completion information 313, such as the expected arrival time for the requester at the destination, when using the pooled transport service.

In FIG. 3B, the user interface 300 is shown to include an information panel 320, which displays multiple legs of the planned trip for the requester. The information panel 320 may instruct the user on actions the user should perform (e.g., "walk to Uber stop").

In FIG. 3C, the user interface 300 displays navigation content 332, along with status information as to the requester's trip. In an example, the status information 324 displays remaining time until arrival of the service provider at the service start location 331. In some variations, if other requesters are matched to the same service start location 331, graphic representations 335 of the other requesters may also be displayed.

FIG. 3D illustrates the user interface 300, displaying status information about the requester's trip while the requester is in the vehicle. The status information 342 can include an estimate arrival time for the user to arrive at his or her target destination. In determining the arrival time, the system 100 may calculate the arrival time of the requester to arrive at the vehicle disembark location 345, and then estimate the requester's travel time (e.g., by walking) from the vehicle disembark location 345 to the target destination 355. The path of travel 344 for the requester from the vehicle disembark location 345 to the target destination 355 may be separately displayed on the user interface 300 from the vehicle route that is in progress.

Figure 3E:
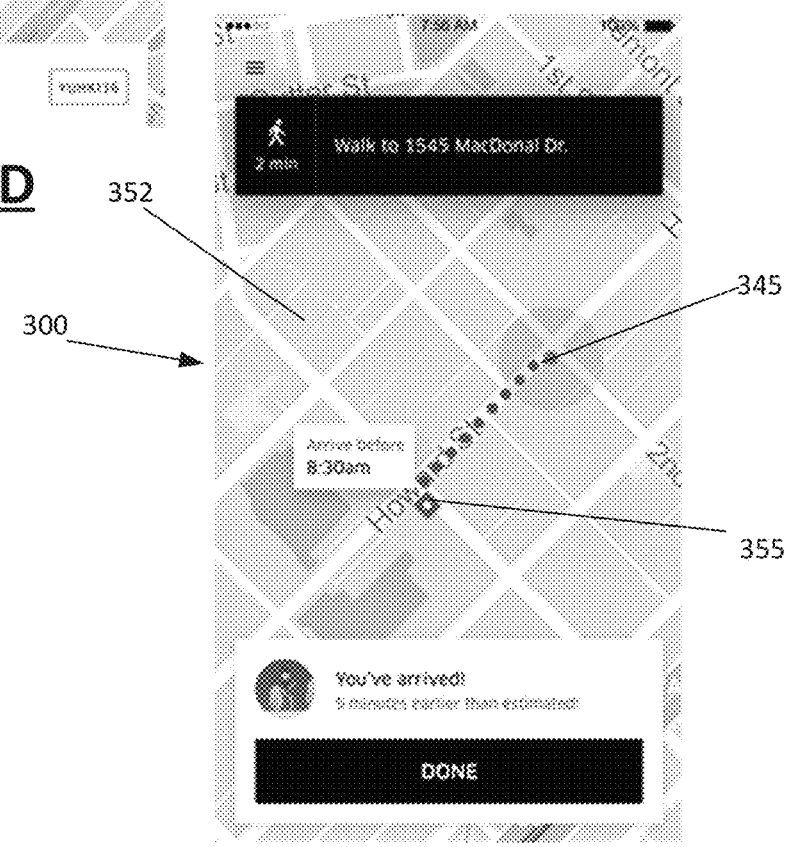

In FIG. 3E, the user interface 300 displays navigation content 352 for enabling the user to independently travel (e.g., walk) from the vehicle disembark location 345 to the requester's target destination 355.

Figure 4:
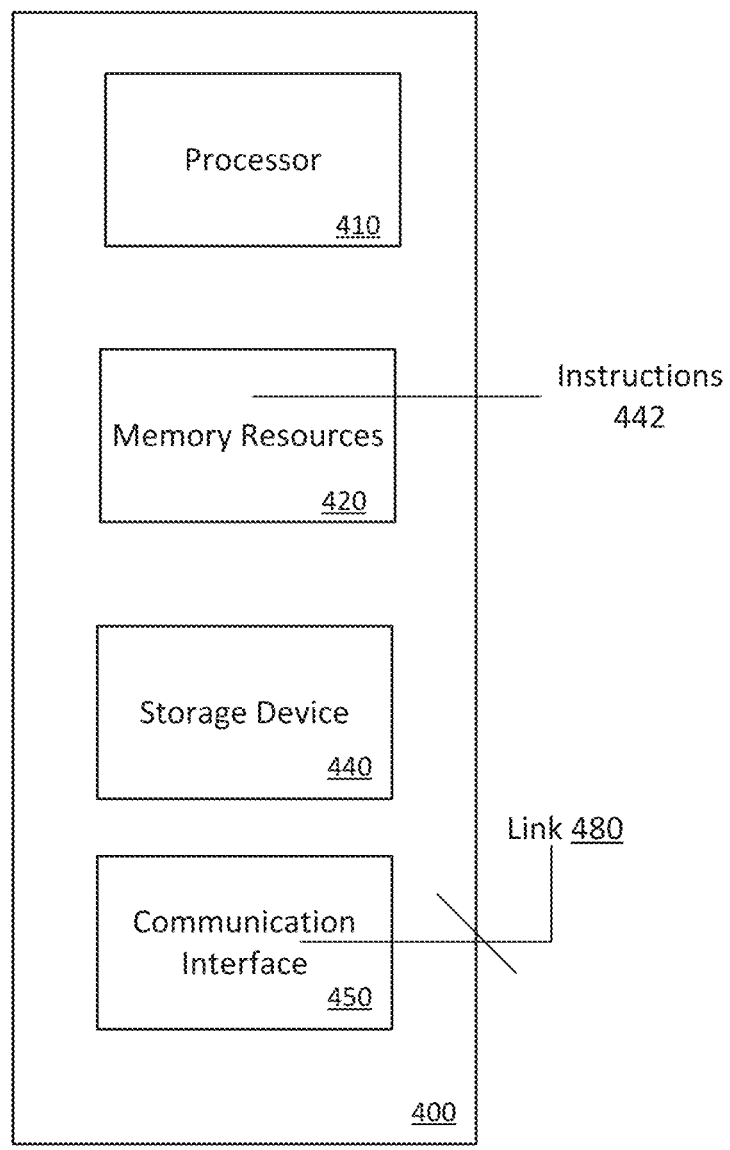
FIG. 4 illustrates a computer system on which one or more embodiments can be implemented.

FIG. 4 illustrates a computer system on which one or more embodiments can be implemented. A computer system 400 can be implemented on, for example, a server or combination of servers. For example, the computer system 400 may be used to implement a network computer system such as shown and described with an example of FIG. 1. Additionally, the computer system 400 may be used to implement a method such as described with an example of FIG. 2.

In one implementation, the computer system 400 includes processing resources 410, memory resources 420 (e.g., read-only memory (ROM) or random-access memory (RAM)), a storage device 440, and a communication interface 450. The computer system 400 includes at least one processor 410 for processing information stored in the main memory 420, such as provided by a random-access memory (RAM) or other dynamic storage device, for storing information and instructions which are executable by the processor 410. The memory resources 420 may also be used for storing temporary variables or other intermediate information during execution of instructions to be executed by the processor 410. The computer system 400 may also include the memory resources 420 or other static storage device for storing static information and instructions for the processor 410. The storage device 440, such as a magnetic disk or optical disk, is provided for storing information and instructions.

The communication interface 450 enables the computer system 400 to communicate with one or more networks (e.g., cellular network) through use of the network link 480 (wireless or a wire). Using the network link 480, the computer system 400 can communicate with one or more computing devices, specialized devices and modules, and one or more servers. The executable instructions stored in the memory resources 420 can include instructions 442, to implement a network computing system such as described with an example of FIG. 1. The executable instructions stored in the memory 420 may also implement a method, such as described with an example of FIG. 2.

As such, examples described herein are related to the use of the computer system 400 for implementing the techniques described herein. According to an aspect, techniques are performed by the computer system 400 in response to the processor 410 executing one or more sequences of one or more instructions contained in the memory 420. Such instructions may be read into the memory 420 from another machine-readable medium, such as the storage device 440. Execution of the sequences of instructions contained in the memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
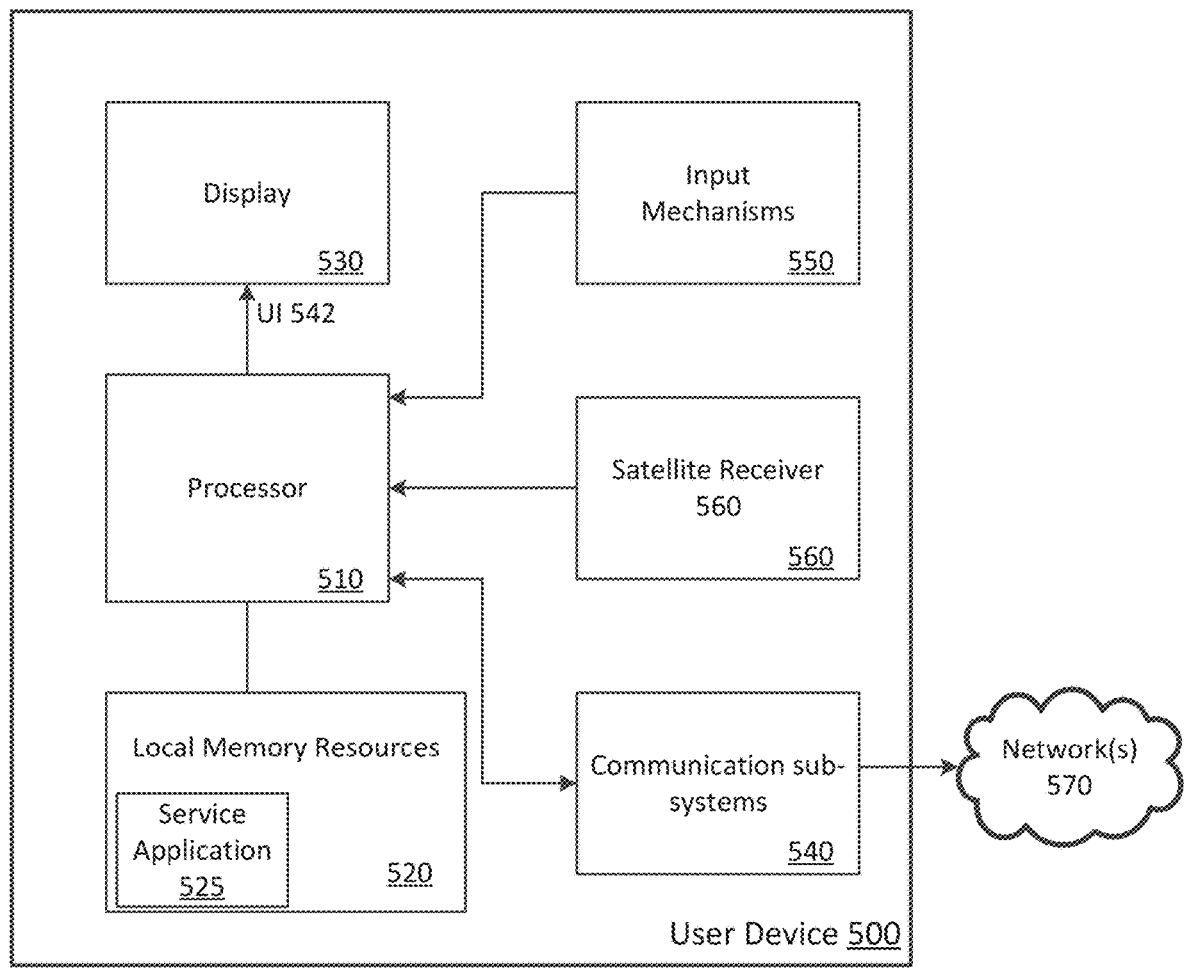
FIG. 5 is a block diagram illustrating an example user device for use with examples as described.

FIG. 5 is a block diagram illustrating an example user device for use with examples as described. In an example, a user device 500 may execute a designated service application 525 for a network service implemented through a network computer system 100 such as described with an example of FIG. 1. In many implementations, the user device 500 can include a mobile computing device, such as a smartphone, tablet computer, laptop computer, VR or AR headset device, and the like. As such, the user device 500 can include typical input mechanisms 550, such as for telephony and/or tablet devices, including a microphone, a camera, a touch screen or other sensor or touch-sensitive mechanism. Additionally, the user device may include a satellite receiver 560 or other location-aware resource. The user device 500 may also include a communication sub-system 540 that is capable of multiple different types of wireless communications, including local communications (e.g., Bluetooth) and wireless network communications with one or more external entities using one or more networks 570 and any number of wireless communication protocols. In certain aspects, the user device 500 can store a designated application (e.g., a service app 525) in local memory resources 520. In variations, the local memory resources 520 can store additional applications executable by one or more processors 510 of the user device 500, enabling access and interaction with one or more host servers over one or more networks 570. In response to a user input (e.g., received through input mechanism 550), the service application 525 can interact with the user device 500 to provide a user interface 542, such as shown with examples of FIG. 3A through FIG. 3E, on a display screen 530 of the user device 500.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
a network communication interface to communicate, over one or more networks, with computing devices of requesters and transport providers of a pooled transport service;
one or more processors; and
a memory storing instructions that, when executed by the one or more processors, cause the network computer system to:
receive, over the one or more networks, a first service request from a computing device of a first requester, the first service request indicating a first destination and a current location of the first requester;
receive, over the one or more networks, a second service request from a computing device of a second requester, the second service request indicating a second destination and a current location of the second requester;
based at least in part on a proximity between the current locations of the first and second requesters, match the first service request and the second service request by:
selecting a pickup location for the first and second requesters;
transmitting, over the one or more networks, rendezvous information to the computing devices of the first and second requesters to enable the first and second requesters to travel to the pickup location;
determining an estimated time interval for each of the first requester and the second requester to arrive at the pickup location;
selecting a transport provider to service both the first service request and the second service request, based at least in part on the pickup location, a current location of the transport provider, and the estimated time interval for each of the first requester and the second requester; and
transmitting, over the one or more networks, a transport invitation to a computing device of the transport provider to enable the transport provider to rendezvous with the first and second requesters at the pickup location and transport the first and second requesters to the first destination and the second destination respectively.

2. The network computer system of claim 1, wherein the executed instructions cause the network computer system to further select the pickup location by determining a heading of each of the first and second requesters.

3. The network computer system of claim 2, wherein the executed instructions cause the network computer system to determine the heading of each of the first and second requesters based on the first destination and the second destination as compared to the pickup location.

4. The network computer system of claim 1, wherein the executed instructions cause the network computer system to select the pickup location from multiple candidate pickup locations that are pre-selected for a region in which the first and second requesters are located.

5. The network computer system of claim 1, wherein the executed instructions cause the network computer system to further select the transport provider based on a proximity between the first destination and the second destination.

6. The network computer system of claim 1, wherein the rendezvous information comprises navigation instructions that navigate the first and second requesters to the pickup location.

7. The network computer system of claim 6, wherein the executed instructions cause the network computer system to transmit the navigation instructions to the computing devices of the first and second requesters before the transport provider is selected.

8. The network computer system of claim 6, wherein the navigation instructions comprise walking instructions.

9. A non-transitory computer readable medium storing instructions that, when executed by one or more processors of a network computer system, cause the network computer system to:
communicate, over one or more networks, with computing devices of requesters and transport providers of a pooled transport service;
receive, over the one or more networks, a first service request from a computing device of a first requester, the first service request indicating a first destination and a current location of the first requester;
receive, over the one or more networks, a second service request from a computing device of a second requester, the second service request indicating a second destination and a current location of the second requester;
based at least in part on a proximity between the current locations of the first and second requesters, match the first service request and the second service request by:
selecting a pickup location for the first and second requesters;
transmitting, over the one or more networks, rendezvous information to the computing devices of the first and second requesters to enable the first and second requesters to travel to the pickup location;

determining an estimated time interval for each of the first requester and the second requester to arrive at the pickup location;

selecting a transport provider to service both the first service request and the second service request, based at least in part on the pickup location, a current location of the transport provider, and the estimated time interval for each of the first requester and the second requester; and transmitting, over the one or more networks, a transport invitation to a computing device of the transport provider to enable the transport provider to rendezvous with the first and second requesters at the pickup location and transport the first and second requesters to the first destination and the second destination respectively.

10. The non-transitory computer readable medium of claim 9, wherein the executed instructions cause the network computer system to further select the pickup location by determining a heading of each of the first and second requesters.

11. The non-transitory computer readable medium of claim 10, wherein the executed instructions cause the network computer system to determine the heading of each of the first and second requesters based on the first destination and the second destination as compared to the pickup location.

12. The non-transitory computer readable medium of claim 9, wherein the executed instructions cause the network computer system to select the pickup location from multiple candidate pickup locations that are pre-selected for a region in which the first and second requesters are located.

13. The non-transitory computer readable medium of claim 9, wherein the executed instructions cause the network computer system to further select the transport provider based on a proximity between the first destination and the second destination.

14. The non-transitory computer readable medium of claim 9, wherein the rendezvous information comprises navigation instructions that navigate the first and second requesters to the pickup location.

15. The non-transitory computer readable medium of claim 14, wherein the executed instructions cause the network computer system to transmit the navigation instructions to the computing devices of the first and second requesters before the transport provider is selected.

16. The non-transitory computer readable medium of claim 14, wherein the navigation instructions comprise walking instructions.

17. A computer-implemented method performed by one or more processors and comprising:

communicating, over one or more networks, with computing devices of requesters and transport providers of a pooled transport service;

receiving, over the one or more networks, a first service request from a computing device of a first requester, the first service request indicating a first destination and a current location of the first requester;

receiving, over the one or more networks, a second service request from a computing device of a second requester, the second service request indicating a second destination and a current location of the second requester;

based at least in part on a proximity between the current locations of the first and second requesters, matching the first service request and the second service request by:

selecting a pickup location for the first and second requesters;

transmitting, over the one or more networks, rendezvous information to the computing devices of the first and second requesters to enable the first and second requesters to travel to the pickup location;

determining an estimated time interval for each of the first requester and the second requester to arrive at the pickup location;

selecting a transport provider to service both the first service request and the second service request, based at least in part on the pickup location, a current location of the transport provider, and the estimated time interval for each of the first requester and the second requester; and transmitting, over the one or more networks, a transport invitation to a computing device of the transport provider to enable the transport provider to rendezvous with the first and second requesters at the pickup location and transport the first and second requesters to the first destination and the second destination respectively.

18. The method of claim 17, wherein the one or more processors further select the pickup location by determining a heading of each of the first and second requesters.

19. The method of claim 18, wherein the one or more processors determine the heading of each of the first and second requesters based on the first destination and the second destination as compared to the pickup location.

20. The method of claim 17, wherein one or more processors select the pickup location from multiple candidate pickup locations that are pre-selected for a region in which the first and second requesters are located.

* * * * *